United States Patent [19]

Kitayama et al.

[11] Patent Number: 5,292,579
[45] Date of Patent: Mar. 8, 1994

[54] COMPRESSED SHEET AND METHOD OF MANUFACTURING THEREOF

[75] Inventors: Hiromi Kitayama, Kamifukuoka; Tsutomu Tomizawa, Niiza; Ken Fujiwara, Kitakyushu; Fumiya Shigeta, Urawa; Hiroyuki Nakano, Kawaguchi, all of Japan

[73] Assignees: Honda Giken Kogyo Kabushiki Kaisha; Nippon Leakless Ind. Co., Ltd., both of Tokyo, Japan

[21] Appl. No.: 715,081

[22] Filed: Jun. 12, 1991

[30] Foreign Application Priority Data

Jun. 20, 1990 [JP] Japan .................. 2-159671

[51] Int. Cl.⁵ .............. B32B 9/04; B65D 53/00; C09K 3/10; F16J 15/06
[52] U.S. Cl. .................. 428/283; 428/280; 428/281; 428/282; 428/284; 428/286; 428/287; 428/323; 428/330; 428/408; 428/920
[58] Field of Search .............. 428/323, 280, 281, 282, 428/283, 284, 330, 286, 920, 408, 287

[56] References Cited

U.S. PATENT DOCUMENTS

| | | | |
|---|---|---|---|
| 3,765,999 | 10/1973 | Toyoda | 428/323 |
| 4,271,228 | 6/1981 | Foster et al. | 428/281 |
| 4,508,777 | 4/1985 | Yamamoto et al. | 428/280 |
| 4,859,526 | 8/1989 | Potepon et al. | 428/286 |
| 5,001,005 | 3/1991 | Blanpied | 428/319.1 |
| 5,047,288 | 9/1991 | Hoshiro et al. | 428/284 |
| 5,098,758 | 3/1992 | Kani | 428/284 |
| 5,098,777 | 3/1992 | Koli | 428/284 |
| 5,114,769 | 3/1992 | Kani et al. | 428/286 |

Primary Examiner—Paul J. Thibodeau
Assistant Examiner—D. S. Nakarani
Attorney, Agent, or Firm—Armstrong, Westerman, Hattori, McLeland & Naughton

[57] ABSTRACT

A compressed sheet comprises: base fibers constituted by inorganic fibers other than asbestos, or organic fibers, or a combination of both; a rubber; rubber chemicals; and fillers. In the compressed sheet a material with both smoothing and reinforcing effects is exposed at least to one of the surfaces of the compressed sheet. A method of manufacturing a compressed sheet comprises the steps of processing a composition for forming the compressed sheet by feeding it into a pair of rolls comprising a hot roll and a cold roll, thereby laminating the composition into a sheet-shaped material on the hot roll, and then peeling off the sheet-shaped laminated material. In this method the composition is fed into the rolls such that a material with both smoothing and reinforcing effects is exposed at least to that surface of the sheet-shaped laminated material which faces the cold roll.

12 Claims, 1 Drawing Sheet

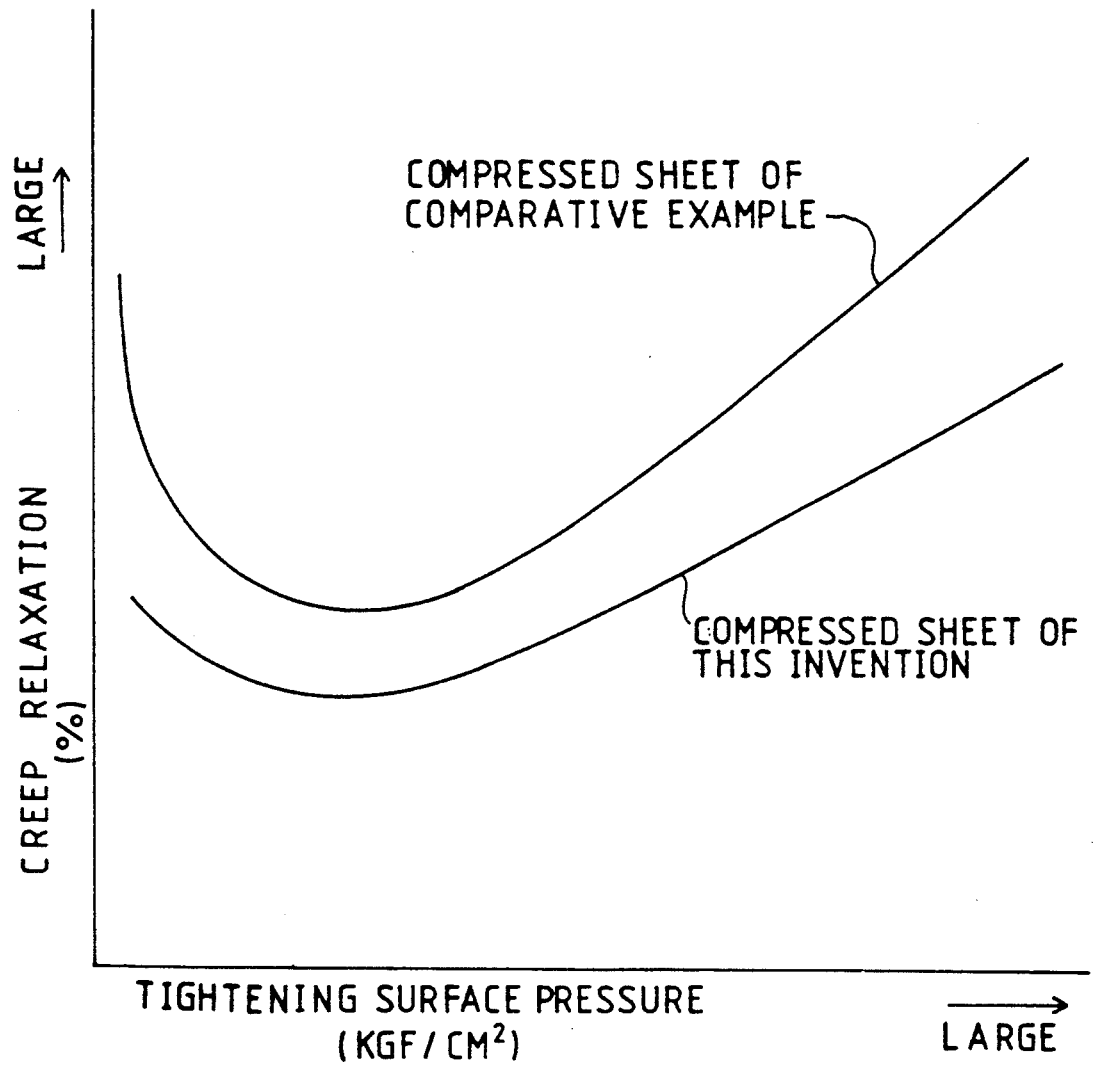

COMPRESSED SHEET AND METHOD OF MANUFACTURING THEREOF

BACKGROUND OF THE INVENTION

1. Field of the Invention

This invention relates to a compressed sheet to be used as a gasket base material, for example, in a motorcar, a ship, various kinds of apparatuses or the like.

2. Description of the Prior Art

As this kind of compressed sheet, those of asbestos make have been conventionally used. However, out of consideration of hazards to the human body or the like, many kinds of alternative products have been proposed. For example, as disclosed in the Japanese Published Unexamined Patent Application No. 129377/1987, there is known a compressed sheet comprising: base fibers constituted by inorganic fibers other than asbestos, organic fibers or a combination of both; a rubber; rubber chemicals; and fillers. This kind of compressed sheet is manufactured by forming a compressed sheet which comprises: base fibers constituted by inorganic fibers other than asbestos, organic fibers, or a combination of both; a rubber; rubber chemicals; and fillers is processed by feeding it between a pair of rolls comprising a hot roll and a cold roll, thereby laminating the composition into a sheet-shaped material on the hot roll. The sheet-shaped material is then peeled off the roll.

However, the asbestos-replaced compressed sheet (i.e., asbestos is replaced by another material to make it asbestos-free) as proposed in the aforementioned patent application has a larger creep relaxation than the compressed sheet of asbestos make, resulting in a possibility of inducing a phenomenon of torque loss. Therefore, a proposal for an asbestos-replaced compressed sheet having an improved creep relaxation has been awaited.

In addition, the method of manufacturing the asbestos-replaced compressed sheet as proposed above has a problem in that the composition forming the compressed sheet is likely to be adhered to the cold roll at an end period of feeding during processing, resulting in a poor workability and variation in properties in the compressed sheet obtained. Consequently, it is rather time-consuming to pick up only the joint sheets of acceptable quality by throwing away those of unacceptable quality.

Accordingly, it is an object of this invention to provide an asbestos-replaced compressed sheet which satisfies the aforementioned requirements, and a method of manufacturing an asbestos-replaced compressed sheet which solves the aforementioned problems.

SUMMARY OF THE INVENTION

To achieve the above object, according to a first aspect of the invention, there is provided a compressed sheet which comprises: base fibers constituted by inorganic fibers other than asbestos, or organic fibers, or a combination of both; a rubber; rubber chemicals; and fillers; wherein a material with both smoothing and reinforcing effects is blended in such a manner that it is exposed at least to one of the surfaces of the compressed sheet.

According to a second aspect of the invention, there is provided a method of manufacturing a compressed sheet, the method comprising the steps of: processing a composition for forming the compressed sheet by feeding it into a pair of rolls comprising a hot roll and a cold roll, thereby laminating the composition into a sheet-shaped material on the hot roll, the composition comprising: base fibers constituted by inorganic fibers other than asbestos, or organic fibers, or a combination of both; a rubber; rubber chemicals; and fillers; and then peeling off the sheet-shaped laminated material; wherein the composition is fed into the rolls such that a material with both smoothing and reinforcing effects is exposed at least to a surface of the sheet-shaped laminated material, the surface facing the cold roll.

As the inorganic fibers other than asbestos, known inorganic fibers which are employed in asbestos-replaced compressed sheets as base fibers may be widely used, those inorganic fibers including glass fibers, rock wool fibers, various kinds of ceramic fibers, carbon fibers, metallic fibers, or the like.

As the organic fibers, known organic fibers which are used in asbestos-replaced compressed sheets as base fibers may also be widely used, those organic fibers including aromatic polyamide fibers, fibrillated aromatic polyamide fibers, polyamide fibers, polyolefin fibers, or the like.

These inorganic and organic fibers may be used alone or in combination. When they are used in combination, the mixing ratio on weight basis of inorganic fibers to organic fibers shall be about 1:1 to 4:1.

The base fibers may be mixed in the compressed sheet in about 10 to 60% by weight.

As the rubber, acrylonitrile butadiene rubber (NBR), styrene butadiene rubber (SBR), polyisoprene rubber (IR), polychloroprene rubber (CR), ethylene-propylene rubber (EPR), fluororubber (FPM), silicone rubber (SI), or the like may be used and mixed in the compressed sheet in about 10 to 30% by weight.

As the rubber chemicals, a vulcanizing agent such as sulfur, zinc oxide, magnesium oxide or the like and a vulcanizing accelerator such as a thiazole-based compound, a polyamine-based compound, a sulfonamide-based compound, a guanidine-based compound, or the like may be used and mixed in the compressed sheet in about 0.5 to 10% by weight.

As the fillers, clay, talc, barium sulfate, sodium bicarbonate, graphite, calcium carbonate, carbon black, diatomaceous earth, mica, alumina sulfate, hydrated alumina, magnesium carbonate, or the like may be used and mixed in the compressed sheet in about 10 to 70% by weight.

As the material with both smoothing and reinforcing effects, which is one of the features of this invention, particulate calcium carbonate having a particle size of about 10 to 30 m$\mu$ and a specific surface area of about 50 to 60 m$^2$/g or the like may be used.

In order for this kind of material with both smoothing and reinforcing effects to be exposed to at least one of the surfaces of the compressed sheet, particularly on that side of the surface which faces the cold roll during manufacturing, that composition of forming compressed sheet which does not contain the material with both smoothing and reinforcing effects, for example, is fed at the beginning into the pair of rolls comprising a cold roll and a hot roll. Then, the composition containing the material with both smoothing and reinforcing effects may be fed thereinto at a last period of feeding at which the adhesion of the composition to the cold roll becomes a problem. Further, if the composition containing the material with both smoothing and reinforcing effects is fed both at the beginning and the end of the feeding, a compressed sheet having exposed the material with both smoothing and reinforcing effects on both surfaces can be obtained.

In the case of the compressed sheet, as the first aspect of the invention, the material with both smoothing and reinforcing effects which is to be exposed at least to one of the surfaces of the compressed sheet brings about an improvement in compressibility of the compressed sheet due to a reinforcing effect of the material with both smoothing and reinforcing effects as well as an improvement in flowability of the compressed sheet under high surface pressure, resulting in an improvement in creep relaxation.

In addition, in the case of the method of manufacturing the compressed sheet, as the second aspect of the invention, due to the presence of the material with both smoothing and reinforcing effects which is fed at the last period of feeding and is exposed to that side of the surface of the sheet-shaped laminated material which faces the cold roll, the sheet-shaped laminated material is prevented from adhering to the cold roll.

BRIEF DESCRIPTION OF THE DRAWING

The drawing shows characteristic curves of creep relaxation of a compressed sheet of this invention and that of a comparative example, respectively.

DETAILED DESCRIPTION OF PREFERRED EMBODIMENT

This invention will now be described by way of an embodiment with reference to a comparative example.

Embodiment 1

In this embodiment, an explanation is made about a compressed sheet in which a material with both smoothing and reinforcing effects is exposed only to one side thereof.

First, those compositions I and II of forming the compressed sheet which do not contain the material with smoothing and reinforcing effects and a composition III of forming the compressed sheet which contain the material with both smoothing and reinforcing effects were prepared.

| Composition I for forming compressed sheet | |
|---|---|
| Fibrillated aromatic polyamide fibers | 15% by weight |
| NBR | 12% by weight |
| Rubber chemicals | 3% by weight |
| Fillers | 70% by weight |
| Toluene | 0.4 1/1 kg of above mixture |
| Composition II for forming compressed sheet | |
| Fibrillated aromatic polyamide fibers | 10% by weight |
| glass fibers | 10% by weight |
| NBR | 18% by weight |
| Rubber chemicals | 2% by weight |
| Fillers | 60% by weight |
| Toluene | 0.4 1/1 kg of above mixture |
| Composition III for forming compressed sheet | |
| Fibrillated aromatic polyamide fibers | 13% by weight |
| NBR | 22% by weight |
| Rubber chemicals | 6% by weight |
| Particulate calcium carbonate | 59% by weight |
| Toluene | 0.4 1/1 kg of above mixture |

Then, the composition I which does not contain the material with both smoothing and reinforcing effects was fed between the hot roll heated to 120° to 150° C. and the cold roll kept at 30° to 50° C. The feeding was changed over to that of composition II at the time when a thickness equal to 10 to 20% of the thickness of the sheet to be obtained was reached. Further, the feeding was changed over to that of the composition III at the time the thickness reached 70 to 80% of the thickness of the sheet to be obtained. During these operations, the load of the rolls was kept at about 20 to 40 bars. Thereafter, the material obtained in the above steps was subjected to a vulcanizing treatment in a drying oven for 30 to 60 minutes at a temperature of 100° to 150° C. In these manufacturing steps, there were observed no adhesion at all of the compositions I, II, III to the cold roll.

COMPARATIVE EXAMPLE 1

A compressed sheet in thickness of 0.3 to 1.5 mm was manufactured using only the composition I of the above embodiment 1, with the remaining conditions being the same as those of the embodiment 1. In this case, there were observed some adhesions of the composition I to the cold roll at an end period of the manufacturing steps.

The compressed sheets, thus obtained, of embodiment 1 in which the material with both smoothing and reinforcing effects is exposed only to one of the surfaces and of the comparative example 1 in which the material with both smoothing and reinforcing effects is not exposed were tested with respect to the creep relaxation. Characteristic curves as shown in the accompanying drawing were obtained.

As can be seen from the drawing, it has been confirmed that the creep relaxation of the embodiment has largely been improved as compared with that of the comparative example.

The creep relaxation was tested by using a creep relaxation testing apparatus specified in JIS R3453 within a range of temperature of 100° to 200° C. and pressure of 30 to 1500 kgf/cm$^2$. Tests were also performed with respect to the following properties, the results being as shown below.

TABLE 1

| | Comparative example | Embodiment |
|---|---|---|
| Density (g/cm$^3$) | 1.83 | 1.85 |
| Compressibility (%) (surface pressure 352 kgf/cm$^2$) | 8 | 7 |
| Recovery (%) | 45 | 52 |
| Oil resistance (%)(after 5 hours in ASTM No.3 oil at 150° C.) | 12 | 11 |
| Tensile loss (%) (perpendicular to direction of rolling) | 32 | 23 |
| Thickness increase (%) | 10 | 7 |
| Weight increase (%) | 10 | 8 |

According to the compressed sheet of this invention, the asbestos-replaced compressed sheet having a superior creep relaxation can be provided. In addition, according to the method of manufacturing of this invention, it has an effect that the superior asbestos-replaced compressed sheet as described above can be manufactured without adhesion thereof to the cold roll.

It is readily apparent that the above-described invention has the advantage in wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A compressed sheet comprising a base layer having first and second sides and comprising organic fibers and/or inorganic fibers other than asbestos, said base layer further comprising a rubber, vulcanizing agent, vulcanizing accelerator, and fillers;

a smoothing and reinforcing layer comprising a smoothing and reinforcing material having particulate calcium carbonate and applied on at least one of said first and second sides of said base layer;

wherein said particulate calcium carbonate has a particle size of about 10 to 30 $\mu$m and has a specific surface area of about 50 to about 60 m$^2$/g.

2. A compressed sheet of claim 1, wherein said organic fibers comprise at least one of aromatic polyamide fibers, fibrillated aromatic polyamide fibers, polyamide fibers or polyolefin fibers.

3. A compressed sheet of claim 1, wherein said inorganic fibers other than asbestos comprise at least one of glass fibers, rock wool fibers, ceramic fibers, carbon fibers or metallic fibers.

4. A compressed sheet of claim 1, wherein said fibers comprise both organic fibers and inorganic fibers other than asbestos at a ratio of about 1:1 to about 1:4.

5. A compressed sheet of claim 1, wherein said fibers are about 10% to about 60% by weight of said compressed sheet.

6. A compressed sheet of claim 1, wherein said rubber comprises at least one rubber selected from the group consisting of butadiene rubber, styrene butadiene rubber, polyisoprene rubber, polychloroprene rubber, ethylene-propylene rubber, fluororubber and silicone rubber.

7. A compressed sheet of claim 6, wherein said rubber is about 10% to about 30% by weight of said compressed sheet.

8. A compressed sheet of claim 1, wherein said vulcanizing agent comprises at least one of sulfur, zinc oxide or magnesium oxide, and wherein said vulcanizing accelerator comprises at least one of a thiazole, a polyamine, a sulfonamide or a guanadine.

9. A compressed sheet of claim 1, wherein said vulcanizing agent and vulcanizing accelerator are about 0.5% to about 10% by weight of said compressed sheet.

10. A compressed sheet of claim 1, wherein said filler comprise at least one of clay, talc, barium sulfate, sodium bicarbonate, graphite, calcium carbonate, carbon black, diatomaceous earth, mica, alumina sulfate, hydrated alumina or magnesium carbonate.

11. A compressed sheet of claim 10, wherein said fillers are about 10% to about 70% by weight of said compressed sheet.

12. A compressed sheet of claim 1, wherein said base layer comprises first and second layers, and wherein said first layer comprises fibrillated aromatic polyamide fibers, acrylonitrile butadiene rubber, vulcanizing agent, vulcanizing accelerator and fillers, and wherein said second layer applied on said first layer comprises glass fibers, fibrillated aromatic polyamide fibers, acrylonitrile butadiene rubber, vulcanizing agent, vulcanizing accelerator and fillers, and wherein said smoothing and reinforcing layer comprises fibrillated aromatic polyamide fibers, acrylonitrile butadiene rubber, vulcanizing agent, vulcanizing accelerator and particulate calcium carbonate.

* * * * *